United States Patent [19]

Murphy

[11] Patent Number: 4,476,750

[45] Date of Patent: Oct. 16, 1984

[54] LATCHING MECHANISM

[76] Inventor: James W. Murphy, 1001 Skylark Dr., Denton, Tex. 76201

[21] Appl. No.: 501,927

[22] Filed: Jun. 7, 1983

[51] Int. Cl.$^3$ .............................................. B23P 19/04

[52] U.S. Cl. ...................................... 81/300; 403/324; 29/229; 81/302

[58] Field of Search .... 29/229; 81/302, 300, 416–417, 81/423; 403/324, 326, 155, 360, DIG. 7; 248/239; 74/527

[56] References Cited

U.S. PATENT DOCUMENTS 4,280,265 7/1981 Murphy ................................ 29/229

*Primary Examiner*—Frederick R. Schmidt

*Assistant Examiner*—Debra S. Meislin

*Attorney, Agent, or Firm*—Peter J. Murphy

[57] ABSTRACT

A convertible retaining ring pliers includes a pair of jaws and a pair of handles all rotatable independently about a common pivot. Each jaw includes a transverse bore spaced from and parallel to the pivot axis for receiving an elongated cylindrical latching pin. Each handle has an associated end plate disposed on one side of the jaws, the end plates having holes to selectively receive an end of a latching pin to selectively latch a jaw to a respective handle. The latching pin bores have elongated grooves and the latching pins have associated friction springs with projecting tabs coacting with those grooves to retain the pins within the assembled pliers. Elongated retaining ring tips have hexagonal shanks received in multi-sided jaw recesses to retain the tips against rotation and to enable selected rotational orientation of the tips. The convertible pliers includes a ratchet mechanism operative between the two handles to maintain the handles closed in a selected position against the load of the retaining ring.

13 Claims, 13 Drawing Figures

LATCHING MECHANISM

BACKGROUND AND SUMMARY OF THE INVENTION

This invention relates to an improved latching mechanism, for selectively and alternatively latching one of two relatively sliding members, disposed on opposite sides of an internal member, to that internal member. More particularly, this invention relates to such a latching mechanism as embodied in a convertible pliers.

In conventional pliers, or pliers-type tools, a pair of elongated members are pivotally connected to each other in an X arrangement, wherein the longer ends of said members at one side of said pivot define handles and wherein the shorter ends of said members on the other side of said pivot define working jaws or implements. In certain pliers-type tools, such as retaining ring pliers, it is desirable that the working jaws or implements are imparted with different movements in response to the squeezing or moving together of the handles. In one mode of operation it may be desirable that the jaws or elements move toward each other in response to movement of the handles toward each other; and in another mode of operation it may be desirable that the jaws or implements move away from each other in response to movement of the handles toward each other.

A pliers-type tool which enables both modes of operation is sometimes referred to as a convertible pliers; and one form of such convertible pliers requires a latching mechanism enabling the latching or coupling of the jaws or implements alternatively to the two handles. A retaining ring pliers of this type is described and claimed in the applicant's U.S. Pat. No. 4,280,265 issued July 28, 1981. In the retaining ring pliers described in that patent the handles are urged away from each other by a biasing spring. The jaws of the pliers carry retaining ring tips for engagement with the lug holes of either internal or external retaining rings. In one mode of operation the jaws are moved away from each other in response to movement of the handles toward each other to place and remove external retaining rings. In the other mode of operation the jaws are moved toward each other in response to movement of the handles toward each other to place and remove internal retaining rings.

In pliers-type tools of the type described it is frequently necessary or desirable that the movement of the tool jaws be precise and that, accordingly, the coupling between the jaws and the handles be as rigid as possible. It may be important then that a latching mechanism, of the type which is the subject of this invention, provide a rigid coupling between the handle and the particular tool jaw to which it is selectively coupled.

In pliers-type tools as described above a single pliers is frequently used with different sizes of work objects; and for this purpose it is frequently desirable to use different sizes of implement tips in association with the convertible pliers. With respect to a retaining ring pliers for example, retaining rings come in many sizes having lug holes of corresponding varying size; and it is desirable to be able to use multiple tips in association with such pliers to accommodate the pliers to rings of various size. In a retaining ring pliers, the tips are typically mounted at the distal ends of elongated pliers jaws; and in a pliers as described in the above mentioned U.S. patent for example, the elongated tips are received in recesses generally aligned with the elongated jaws.

For some uses of a retaining ring pliers, it is desirable that the operator posts of the retaining ring tips, which are received in the lug holes of the retaining ring, be angled relative to the shanks of the tips. In this situation, the load on the tips when the pliers is used exerts a force tending to rotate the tips within the respective jaws. To obviate such rotation it is desirable that the shanks of the tips have a coacting relation with the recesses in the distal ends of the jaws, so that the tips cannot rotate under load within the mounting recesses.

Where pliers-type tools as above described are used with relatively large or heavy retaining rings for example, the load resistance in use is considerable. For some applications, the retaining ring must be placed precisely and carefully within a confined area, and this may be difficult for a user to do when he must maintain manually the desired compression on the handles in order to manipulate the retaining ring. To facilitate such operation it is desirable that the pliers have spring means biasing the handles apart and cooperating ratchet means for locking the handles together in a desired relationship. Pliers with this desired feature should also have ready means for releasing the ratchet mechanism when desired.

An object of this invention is to provide an improved latching mechanism for selectively and alternatively joining relative movable external members to a common internal member.

Another object of this invention is to provide such improved latching mechanism which is particularly adapted for use with a convertible pliers or pliers-type tool.

A further object of this invention is to provide such improved latching mechanism which provides an improved and more durable and rigid linking or coupling between the tool handles and the tool jaws.

Still another object of this invention is to provide a pliers-type tool having means for mounting implement tips in the respective jaws in a manner that the tips will not rotate under load.

A still further object of this invention is to provide a convertible plier-type tool having means for locking the tool handles in a desired relationship.

Another object of this invention is to provide a latching mechanism as above described wherein latching members project from the face of one handle or external member, and may be very readily and easily shifted by the user to engage the jaw with the other respective handle or external member.

These objects are accomplished in a pliers which includes a pivot, first and second jaws arranged for oscillation toward and away from each other about that pivot, and first and second handles arranged for oscillation toward and away from each other about that same pivot. The handles have portions disposed on respective opposite sides of the jaws adjacent to the pivot. An elongated latch pin is disposed in each jaw for alternative and selective engagement with one or the other of the handles. The latch pins are disposed in transverse bores having axes parallel to the axis of the pivot, and each of the handles has a pair of spaced holes positioned to receive the latch pins. The latch pins in the first and second jaws are selectively engaged in the holes of respective first and second handles, to effect movement of the jaws toward each other when the handles are moved toward each other; and the latch pins in the first and second jaws are selectively engaged in the holes of the respective second and first handles to effect movement of the jaws away from each other when the handles are moved toward each other.

The improvement in the pliers is that the latch pins are elongated and generally cylindrical and are received in generally cylindrical bores within the jaws, these bores having however an elongated recess in one wall. Each pin has an external annular groove intermediate its ends to receive a C-shaped circular spring having a tangential tab. The springs are configured to be disposed within the annular grooves with the spring tab projecting into the elongated recesses. The holes of the handles have diameters substantially the same as those of the bores and latch pins to provide rigid coupling between the handles and jaws.

More particularly the pliers jaws are elongated and have linear multi-sides recesses for receiving the linear shanks of implement tips, which shanks have a coacting multi-sided cross section.

Also more particularly the pliers handles are provided with spring means for expanding the handles and ratchet means for maintaining the handles in a selected contracted condition.

The novel features and the advantages of the invention, as well as additional objects thereof, will be understood more fully from the following description when read in connection with the accompanying drawings.

DRAWINGS

DESCRIPTION OF THE PREFERRED EMBODIMENT

The drawings illustrate a convertible retaining ring pliers adapted for use with heavier retaining rings which may have a diameter of three inches to four inches for example. The principal components of the tool are a pair of handles 11 and 12, a pair of elongated jaws 13 and 14, and a pivot pin 15 in the form of a bolt assembly for example. In the retaining ring plier described the jaws are designed for the mounting of work implements in the form of elongated retaining ring tips 16 having operator posts at the distal ends to be received in the lug holes of standard retaining rings. In other types of plier-type tools the jaws may be adapted to mounted other types of work implements; or the jaws themselves may be in the form of work implements.

Figure 1:
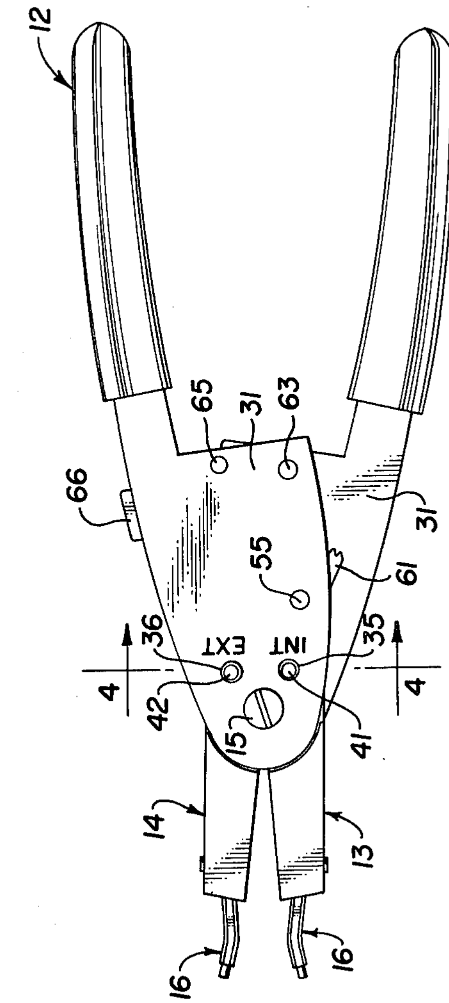
FIG. 1 is a plan view of one form of tool according to the invention.
Figure 2:
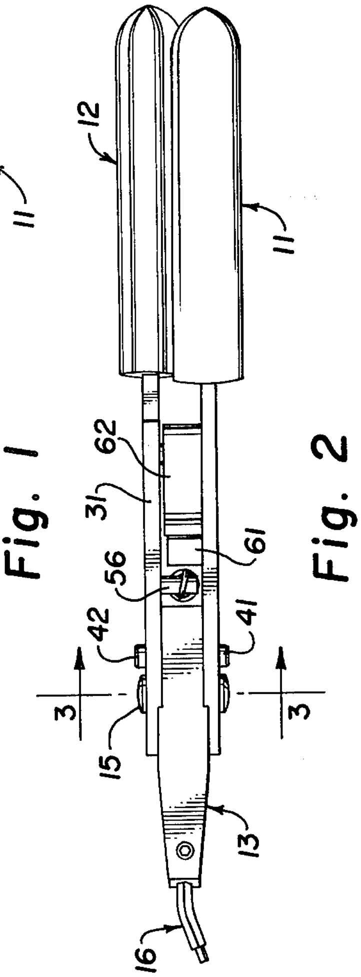
FIG. 2 is a side view of the tool of FIG. 1.
Figure 3:
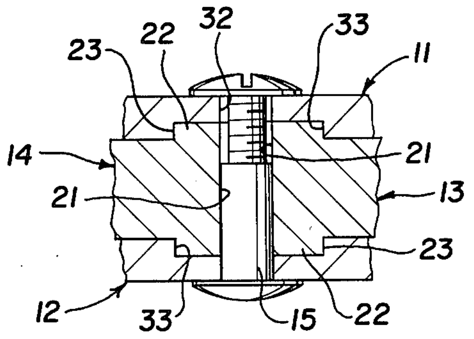
FIG. 3 is a transverse sectional view taken along the line 3—3 of FIG. 2.
Figure 13:
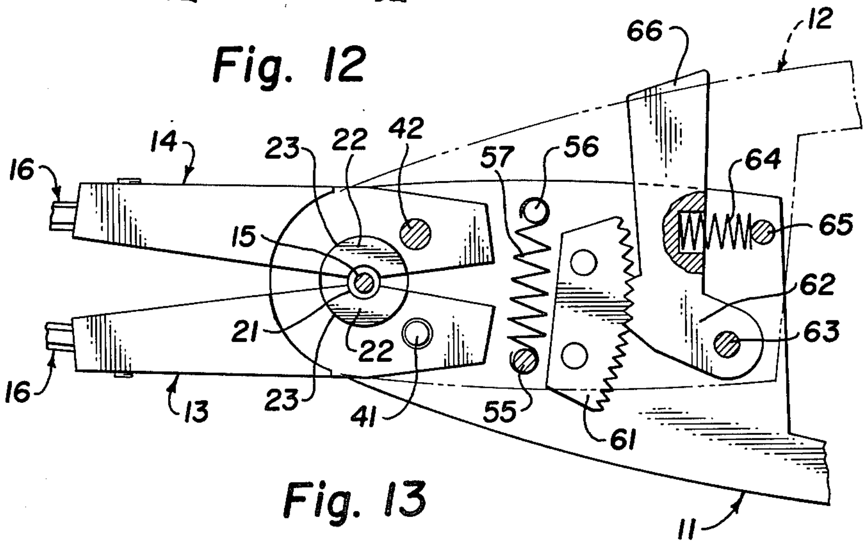
FIG. 13 is a fragmentary plan view of the tool of FIG. 1, with the top handle removed to show the ratchet mechanism and other internal parts.

In assembled relation, as best seen in FIGS. 1, 3 and 13, the elongated jaws 13 and 14 are disposed in side-by-side relation, and have confronting, transverse, cylindrically concave bearing recesses 21, for bearing engagement with the cylindrical shank of the pivot pin 16. At its opposite faces each jaw is provided with a projecting semi-circular flange 22 which provides an external cylindrical bearing shoulder 23, concentric with its bearing recess 21.

The handles 11 and 12 may be fabricated from suitable plate material, such as steel, and are enlarged at the pivot ends thereof to define end plates 31 which are disposed parallel to each other to partially confine the jaws 13 and 14 and to enclose other components of the pliers to be described.

The handle end plates 31 are provided with transverse bores 32 to pass the pivot pin 15, and are also provided with recesses concentric with the bores 32 and providing internal cylindrical bearing shoulders 33 for coaction with the bearing shoulders 23 of the jaws 13 and 14. Through coaction then of the pivot pin 15 and the bearing shoulders 23 and 33, both jaws and both handles are mounted for rotation about a common defined axis; and these principal components are maintained in the operative relation by the pivot pin which is preferably in the form of a bolt and nut assembly.

Figure 4:
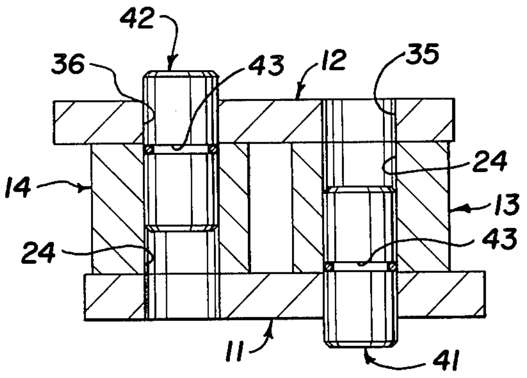
FIGS. 4 and 5 are transverse sectional views taken along the line 4—4 of FIG. 1, showing alternative operational modes.
Figure 5:
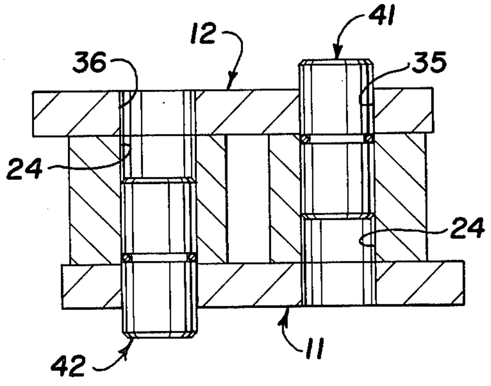
Figure 7:
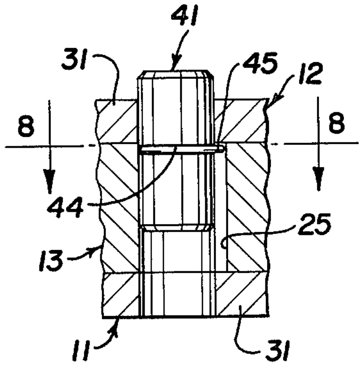
FIG. 7 is a fragmentary sectional view taken along the line 7—7 of FIG. 6.
Figure 8:
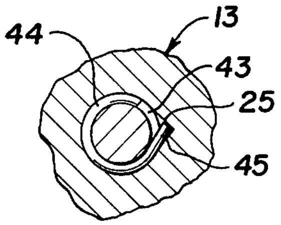
FIG. 8 is a fragmentary sectional view taken along the line 8—8 of FIG. 7.
Figure 9:
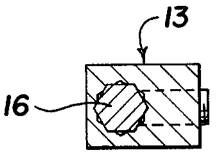
FIG. 9 is a sectional view taken along the line 9—9 of FIG. 6.

To effect the convertibility of the pliers, means are provided for coupling each of the jaws alternatively to one or the other of the two handles. In this manner the jaw is operatively linked to one or the other of the handles for oscillation therewith about the pivot. To accomplish this each jaw is provided at its inner end with a transverse bore 24, spaced from and parallel to its respective bearing recess 21. This bore is cylindrical except that it is provided, at one side, with an elongated recess or groove 25, best seen in FIGS. 7 and 8, which is coextensive with the bore 24. Elongated cylindrical latch pins 41 and 42 are disposed in these bores 24 and are dimensioned for a close sliding fit within the bores, as best seen in FIGS. 4 and 5. Each latch pin is provided with an external annular groove 43 equidistant between its ends, dimensioned to receive a control spring 44. The control spring is a generally C-shaped wire spring having a tangential tab 45; and is formed with a free diameter larger than that of a bore 32 so that the spring, when confined in a latch pin annular groove, will expand into frictional engagement with the bore walls. The control spring tab 45 is configured to extend into the longitudinal recess 25, providing a control function to be described.

The handle end-plates 31 are each provided with a pair of transverse bores 35 and 36, spaced from each other and from the pivot pin bore 32 and disposed to be axially aligned with respective bores 24 of the jaws in selected relative position. These handle bores 35 and 36 have the same diameter as the bores 24 of the jaws, so that when a latch pin is received within a handle bore, that handle is securely coupled to the respective jaw. As best seen in FIGS. 4 and 5, the latch pins 41 and 42 have a length such that when a pin is fully confined within a jaw bore 24 it extends through and beyond one of the handle bores such that it protrudes from the external face of the handle end plate. In assembled relation of the pliers, it will be seen that the handle end plates 31 are contiguous to the opposite faces of the jaws 13 and 14 and maintained in that relation by the pivot pin assembly 15; and it will be seen then that the latch pins 41 and 42 are confined within the assembly by the coaction of the control spring tabs 43 within the recesses 25 of the jaw bores.

As will now be described, through the coaction of the pivot assembly 15, 23, 33, and the latch pins 41 and 42 each jaw 13 or 14 may be selectively and rigidly linked or coupled to a selected handle 11 or 12.

The described convertible retaining ring plier is adapted for two operational modes which may be referred to as "the external ring mode" and the "internal ring mode". FIGS. 1, 4, 10, 11 and 13 particularly illustrate the external ring mode. In this mode the jaw 13 is coupled to the handle 11 and the jaw 14 is coupled to the handle 12 so that squeezing of the handles toward each other will result in corresponding divergence of the jaws away from each other. To effect this coupling the pins are positioned as illustrated in FIG. 4; and it will be seen that the pin 42 projects from the upper handle end plate 31 as viewed in this figure and in FIG. 1, and that the latch pin 41 projects from the lower handle end plate. Referring to FIG. 1 it will be seen that a legend "EXT" is imprinted on the end plate of the handle 12, adjacent to the bore 36 which is positioned to receive the latch pin 42, and that the legend "INT" is placed on the end plate adjacent to the bore 35 which is positioned to receive the latch pin 41. In this external mode then, the projecting latch pin 42 at the bore bearing the legend "EXT" informs the user that the pliers is in the "external ring mode". Similarly, when the plier is in the "internal ring mode" the pin 41 will be projecting and provide that indication to the user.

Another aspect of the "external ring mode" is the orientation of the implement tips 16 with respect to each other. The tips 16 are preferably fabricated from elongated bar stock, hexagonal in cross section, and may be provided at one end with reduced operator posts 51 to be received in the holes of the retaining rings. In the illustrated pliers, these tips 16 are bent intermediate their ends such that the operator posts are angled about 15° relative to the shanks 52, which are linear to be received in confining recesses within the distal ends of the jaws. This slight angle imparted to the tips 16 serves two purposes. It enables the user to view past the distal ends of the jaws to enable the positioning of the posts 51 into the holes of a retaining ring which may be in a position of somewhat difficult access. Secondly, it enables the tips 16 to be oriented rotationally, relative to the jaws, between the outwardly flared condition illustrated in FIG. 1, for the "external ring mode" and an inwardly flared condition illustrated in FIG. 6, for the "internal ring mode". The angling of the tip post ends relative to the shank ends, however, creates an additional tortional load on the tips and a rotational load on the tip mounting structure within the jaws. To facilitate the selective orientation of the tip post ends and to accommodate the rotational load, the jaws are provided with mounting recesses which are multi-sided, preferably twelve-sided, dimensioned to closely receive the hexagonal or multi-sided shanks 52 of the tips 16. The mounting of an hexagonal shank within a twelve-sided recess enables rotational orientation with 30° increments; and the coaction of this 30° incremental rotation with the angled relation of the tip shanks and post ends enables the selection of the desired outward flared or inward flared orientation of the tips for the two operational modes. Typically, the tips 16 are retained against axial movement within the mounting recesses by means of set screws.

Figure 10:
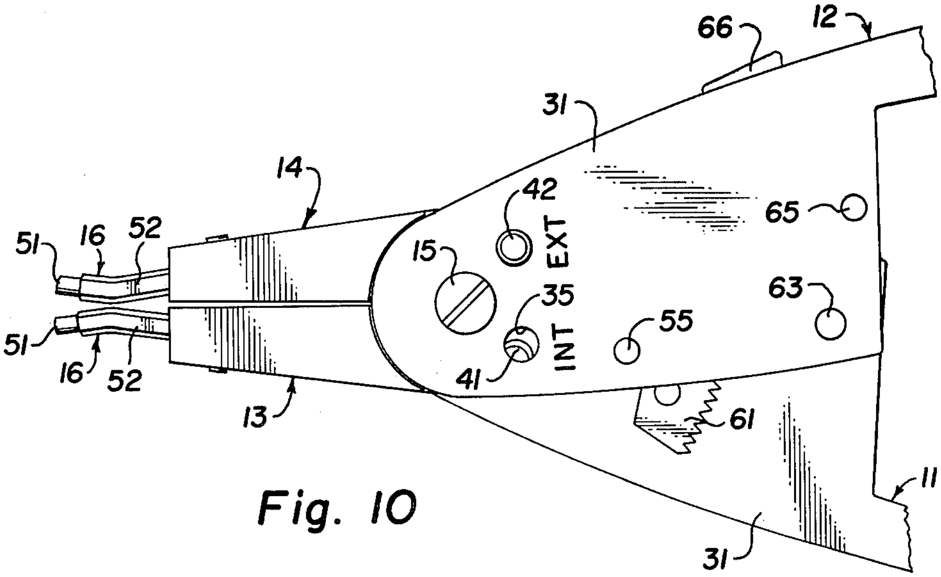
FIG. 10 is a fragmentary plan view showing the tool of FIG. 1 with the jaws closed.
Figure 11:
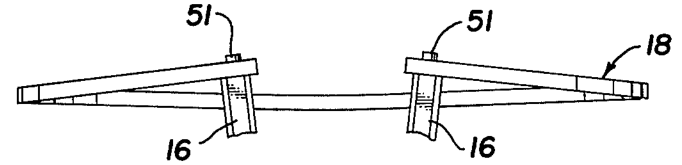
FIG. 11 is an edge view of an external retaining ring expanded by means of the tool of FIG. 1.

The outward flaring of the tip posts 51 enables the more secure handling of an external retaining ring 18 as best seen in FIG. 11. When this ring is expanded by the pliers, the free ends of the ring are distorted as seen in FIG. 11 such that the resistance to expansion tends to retain the ring on the tips. FIG. 10 illustrates the pliers with the jaws and tips positioned to engage an external ring in place, to effect the expansion thereof.

Figure 6:
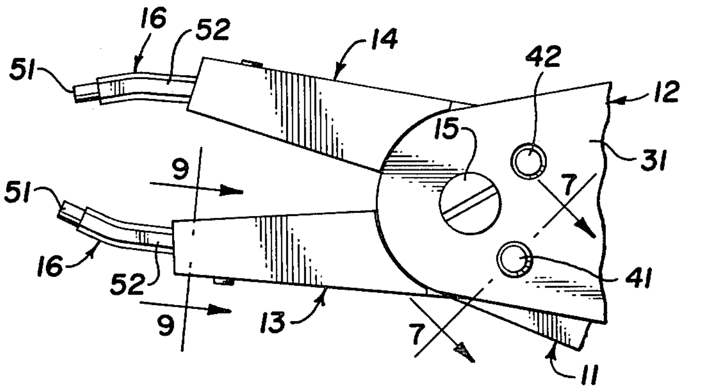
FIG. 6 is a fragmentary plan view of the tool of FIG. 1 showing the tool tips oriented for an alternative operational mode.

The internal ring mode of the retaining ring pliers is particularly illustrated in FIGS. 5 and 6. For this mode the latch pin 41 of the jaw 13 is now engaged with the handle 12, and the latch pin 42 of the jaw 14 is now engaged with the handle 11.

Figure 12:
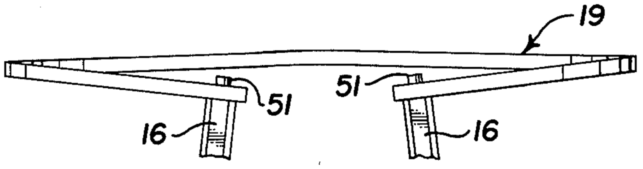
FIG. 12 is an edge view of an internal retaining ring contracted by means of the tool of FIG. 6.

Accordingly, the squeezing of the handles together will result in corresponding convergence of the jaws toward each other to reduce the diameter of an internal retaining ring. As best seen in FIG. 6, the implement tips 16 are now oriented in the respective jaws, that the posts 51 converge toward each other relative to the shanks 52. With this orientation of the posts, the movement of the posts toward each other to compress a retaining ring 19, as seen in FIG. 12, again has the effect of deflecting the ends of the ring from the general plane such that this resistance to deflection will tend to retain the ring on the tips.

For convenience of use of the pliers, it is desirable that a spring be provided to normally urge the distal ends of the handles away from each other. For this purpose anchor posts 55 and 56 project inwardly from the end plates of respective handles 11 and 12, and are spaced apart from each other for all conditions of operation. A tension spring 57 connected between these anchor posts urges the posts toward each other and the handles away from each other. Particularly for a retaining plier designed for use with relatively large retaining rings, it is desirable that a mechanism be provided to maintain the handles in a desired contracted condition to maintain the retaining rings in a desired stress condition for either the placing or removal of the rings in an associated work piece. Particularly, where a retaining ring is in a position of difficult access, it may be difficult for the user to manipulate and direct the pliers while at the same time maintaining the desired compression force on the handles to expand or contract a retaining ring as required. For this purpose the pliers illustrated in the drawing is provided with a ratchet mechanism operative between the end plate 31 of the two handles. As best seen in FIG. 13, a fixed ratchet member or rack 61 having multiple teeth is fixed to the internal face of the end plate for the handle 11; and a pawl 62 is pivotally mounted on the internal face of the end plate for the handle 12 by means of a pivot post 63. The pawl 62 includes one or more teeth disposed to be engaged with the teeth of the rack 61 under the urging of a compression spring 64 compressed between the pawl and an anchor post 65. The pawl includes an arm 66 which extends laterally beyond the edge of the end plate for the handle 12, enabling the user of the pliers to readily engage that arm to release the pawl from the rack. The engagement of the ratchet mechanism is automatic with the compression of the handles, and the mechanism is readily released when desired.

As has been mentioned above, a feature of the latch pin mechanism for changing the operational modes of the tool, is that the latch pins 41 and 42 project from the exterior surface of the handle end plates, and provide a visual indication to the user of the existing operational mode of the tool. Another feature of this latching system is that when it is desired to change from one operating mode to another, this is readily accomplished by the user applying finger pressure to the exposed end of the latch pin 42 for example and then manipulate the handle to effect alignment of the pin 42 with the bore 35 in the end plate of the lower handle 11. When this alignment occurs, the pin 42 will be easily moved downwardly into partial engagement with the bore 35. With the use of a suitable implement, the pin 42 is then readily pushed through to the full engagement position illustrated in FIG. 5, wherein it is released from the handle 12. Turning the pliers over, a similar operation is performed to effect the shifting of the latch pin 41.

What has been described is an improved form of convertible pliers or pliers-type tool.

A feature of the invention is the improved latching mechanism by which each of a pair of jaws is selectively and alternatively coupled to each of a pair of handles. An advantage of this mechanism over prior art mechanisms, is that the contact area of the latching pin engagement with both the jaws and the handles is significantly greater so that the coupling between each jaw and its respective handle is quite rigid, thereby enabling precise manipulation of the jaws by the handles.

A feature and advantage of the latching mechanism is that the latching pins project beyond the exterior surface of the handles, and thereby perform two functions incidental to the primary latching function of these pins. One function is that the projecting end of a latching pin, coacting with a legend imprinted on the external handle surface, provides a visual indication of the operating mode or condition of the convertible pliers. Another function is the convenience of shifting the latching pin to convert the tool to the alternative operational mode. During that shifting the pin is readily moved into the recess in the opposite blind handle through manipulation of the handles while maintaining finger pressure on the projecting pin end.

Another feature of the invention is the provision of mounting the retaining ring tips in coacting recesses in the pliers jaws in a manner to prevent relative rotation of the tips within the recesses, and also in a manner to select the desired angular orientation of the tips relative to the jaws. This orientation selection enables the tips to be positioned to be flared outwardly for more efficient and safe use with an external retaining ring, and to be flared inwardly for a more efficient and safe use with an internal retaining ring.

A further feature and advantage of the invention is the provision of a ratchet mechanism in a convertible retaining ring pliers which enables the retaining of the handles in a selected closed condition against the load resistance of both internal and external rings. This feature facilitates the use of the tool with relatively large rings, where the rings need to be placed in or removed from places of difficult access.

While a preferred embodiment of the invention has been illustrated and described, it will be understood by those skilled in the art that changes and modifications may be resorted to without departing from the spirit and scope of the invention.

What is claimed is:

1. In a pliers comprising means defining a pivot; first and second jaws arranged for oscillation toward and away from each other about said pivot means; first and second handles arranged for oscillation toward and away from each other about said pivot means; said handles having portions, adjacent to said pivot means, disposed on respective opposite sides of said jaws; a latch pin slidably disposed in each jaw for alternative engagement with one or the other of said handle portions; said latch pins being disposed in transverse bores in said jaws having axes parallel to the axis of said pivot means; each of said handle portions having a pair of spaced holes disposed to receive said latch pins; said latch pins in said first and second jaws being selectively slidably engaged in the holes of respective first and second handles, to effect movement of said jaws toward each other when said handles are moved toward each other; and said latch pins in said first and second jaws being selectively slidably engaged in the holes of respective second and first handles to effect movement of said jaws away from each other as said handles are moved toward each other;

the improvement comprising:

said bores being generally cylindrical, having an elongated recess in one wall;

each of said latch pins comprising an elongated, generally cylindrical member having an external annular groove intermediate its ends; a C-shaped circular spring, having a tangential tab, configured to be disposed in said annular groove with its tab projecting therefrom; said tab extending into said longitudinal recess of said bore for slidable engagement therewith.

2. In a pliers as set forth in claim 1, the improvement comprising said circular portions of said C-shaped springs being expanded into frictional engagement with the cylindrical walls of said bores.

3. In a pliers as set forth in claim 1, the improvement comprising said latch pins each having a length slightly greater than the combined length of a respective transverse bore and depth of one of said handle holes, whereby when one of said jaws is latched to one of said handle portions, said pin will protrude from said one handle portion;

and the projecting portion of said pin being depressible with the finger of the user to partially engage said latch pin in the holes of said other handle portion.

4. In a pliers as set forth in claim 1, the improvement comprising said handle portions being disposed contiguous to said jaws; and said handle portions, coacting with said spring tab, limiting axial movement of said latch pin within said pliers.

5. In a pliers as set forth in claim 1, the improvement comprising said pliers having elongated jaws; said jaws having generally linear recesses at the distal ends thereof, multi-sided in cross section, to receive the shanks of implement tips;

a plurality of implement tips having elongated shanks, multi-sided in cross section, for coacting mounting relation with said mounting recesses, to be received in said jaws in nonrotational relation.

6. In a pliers as set forth in claim 5, the improvement comprising said implement tips, for disposition in each jaw, comprising a retaining ring tip having a proximal linear shank and a distal implement post angled relative to said shank;

said coacting multi-sided mounting recesses and shanks enabling orientation of said tip posts in selected outwardly or inwardly flared relation for use with respective external or internal retaining rings.

7. In a pliers as set forth in claim 1, the improvement comprising means for urging said handles away from each other.

8. In a pliers as set forth in claim 7, the improvement comprising ratchet means for maintaining said handles in a selected urged apart condition comprising: a ratchet member having a plurality of ratchet teeth mounted on one of said handles; a coacting ratchet pawl mounted on the other of said handles; and means urging said ratchet member and pawl into engagement

9. In a pliers as set forth in claim 8, the improvement comprising said pawl being movably mounted in said arm;

said ratchet pawl having an arm engageable by the user to release said pawl from said ratchet member.

10. A latching mechanism for use with an internal member and a pair of relatively movable external members disposed on opposite sides of said internal member, for latching alternately one or the other of said external members to said internal member, comprising said internal member having a transverse generally cylindrical bore provided with an elongated recess in one wall;

said external members each having a generally cylindrical hole for selective alignment with said cylindrical bore, and having the same diameter as said cylindrical bore;

an elongated cylindrical latch pin slidably disposed in said bore, having an external annular groove intermediate its ends;

a generally C-shaped circular spring, having a tangential tab, configured to be disposed in said latch pin annular groove with its tab projecting therefrom into said longitudinal recess of said bore for slidable engagement therewith;

and said latch pin having a length to extend into the hole of one selected external member while remaining clear of the other external member.

11. In a latching mechanism as set forth in claim 10, the improvement comprising said circular portion of said C-shaped spring being expanded into frictional engagement with the cylindrical wall of said bore.

12. In a latching mechanism as set forth in claim 10, the improvement comprising said latch pin having a length slightly greater than the combined length of said transverse bore and the depth of one of said external member holes whereby, when said internal member is latched to one of said external members, said pin will protrude from said one external member; and the projecting portion of said pin being depressible to partially engage said latch pin in the recess of said other external member.

13. In a latching mechanism as set forth in claim 10 the improvement comprising said external members being disposed contiguous to said internal member; and said external members, coacting with said spring tab, limiting axial movement of said latch pin.

* * * * *